United States Patent
Chou et al.

(10) Patent No.: US 8,971,904 B2
(45) Date of Patent: Mar. 3, 2015

(54) MOBILE COMMUNICATION APPARATUSES, WIRELESS COMMUNICATION SYSTEMS, FEMTOCELLS AND METHODS FOR RESOURCE ALLOCATION USING THE SAME

(75) Inventors: Wei Chou, New Taipei (TW); ChingYao Huang, HsinChu (TW)

(73) Assignee: Acer Incorporated, Taipei Hsien (TW)

( * ) Notice: Subject to any disclaimer, the term of this patent is extended or adjusted under 35 U.S.C. 154(b) by 260 days.

(21) Appl. No.: 13/557,782

(22) Filed: Jul. 25, 2012

(65) Prior Publication Data

US 2013/0157672 A1    Jun. 20, 2013

(30) Foreign Application Priority Data

Dec. 20, 2011    (TW) .............................. 100147274 A

(51) Int. Cl.
*H04W 72/00*    (2009.01)
(52) U.S. Cl.
USPC ..... 455/450; 455/451; 455/452.1; 455/452.2; 370/329; 370/330; 370/341
(58) Field of Classification Search
CPC ............ H04W 72/04; H04W 72/0446; H04W 72/0453; H04W 72/0466; H04W 72/1252; H04W 72/1257
USPC ........... 455/450, 451, 452.1, 452.2, 453, 464; 370/329, 330, 341
See application file for complete search history.

(56) References Cited

U.S. PATENT DOCUMENTS

| | | |
|---|---|---|
| 2010/0111021 A1 | 5/2010 | Hui |
| 2010/0203886 A1* | 8/2010 | Nobukiyo ..................... 455/434 |
| 2013/0051358 A1* | 2/2013 | Turtinen et al. ............... 370/330 |

FOREIGN PATENT DOCUMENTS

CN    102202406    9/2011

OTHER PUBLICATIONS

European Search Report dated Nov. 28, 2012.
English language translation of abstract of CN 102202406 (published Sep. 28, 2011).

* cited by examiner

*Primary Examiner* — Wayne Cai
(74) *Attorney, Agent, or Firm* — McClure, Qualey & Rodack, LLP

(57) ABSTRACT

A method for resource allocation for use in a wireless communication system including at least one first femtocell and one neighboring second femtocell is provided. At least one first mobile communications device camps on the first femtocell. The method includes the steps of determining a first group corresponding to the first femtocell and the second group corresponding to the second femtocell according to at least one signal-to-interference ratio (SIR) of the first and second femtocells measured by the first mobile communications device and a threshold, wherein the first mobile communications device is included in the first group and the second group simultaneously, and the first and second groups forms an allocation group when the measured SIR of the first and second femtocells is less than the threshold, and sequentially performing a resource-allocation procedure on each group of the allocation group according to a specific allocation order.

15 Claims, 12 Drawing Sheets

MOBILE COMMUNICATION APPARATUSES, WIRELESS COMMUNICATION SYSTEMS, FEMTOCELLS AND METHODS FOR RESOURCE ALLOCATION USING THE SAME

CROSS REFERENCE TO RELATED APPLICATIONS

This application claims priority of Taiwan Application No. 100147274, filed on Dec. 20, 2011, and the entirety of which is incorporated by reference herein.

BACKGROUND OF THE INVENTION

1. Field of the Invention

The invention generally relates to resource allocation in a wireless communications system, and more particularly, to methods for resource allocation and related mobile communications devices, femtocells and wireless communication systems capable of performing resource allocation in a wireless communication environment where multiple femtocells interfere with each other within a coverage area.

2. Description of the Related Art

In a typical wireless communication network, the deployment of network nodes is generally planned by the operator beforehand. However, the network coverage is sometimes inevitably limited due to signal attenuation in structures, especially in indoor areas, such as home premises and office areas. A femtocell is a small cellular base station, typically designed for use in a home or small business, which allows a wireless communication network to extend network coverage indoors. To restrict the interference to other users in the macro cell, the coverage of a femtocell is far smaller than that of a macro base station. In a hybrid access network, the coverage of a macro base station may consist of a large number of femtocells. For a long term evolution (LTE) network developed by the 3$^{rd}$ Generation Partnership Project (3GPP) origination, a femtocell may be referred to as a Home Node-B (HNB) or a home evolved Node-B (or HeNB), and usually enhances the wireless transmission quality of the service network in the indoor environment such as homes or small commercial areas. The HNB can connect to a service provider network via a wired or wireless backhaul connection. For example, the HNBs or HeNBs are used for deployment on school campuses or are used for deployment in users' homes.

For the network architecture with the aforementioned femtocells, most of the previous technology tends to focus on the resource allocation method between the macro cell and femtocell, while ignoring the seriousness of interactive interference among the femtocells. The current resource allocation method for the interactive interference among the femtocells requires a central control system to control all the base stations, collect information from all base stations, and decide how to allocate resources. However, for an urban area with an intensive deployment of femtocells, because of the plug-and-play features of the femtocell, the number of base stations of the interactive interference may be too large, making the previous method inapplicable in an urban area with an intensive deployment of femtocells. In addition, many of the base stations need to be controlled, leading to long computation times that seriously affect the user. On the other hand, if there is no central control system, the chain effects generated by interactive interference among the femtocells may easily be ignored, resulting in more serious deterioration of system performance in an urban area of intensive deployment.

BRIEF SUMMARY OF THE INVENTION

Accordingly, embodiments of the invention provide apparatuses and methods for resource allocation in a wireless communications system. In one aspect of the invention, a method for resource allocation for use in a wireless communication system is provided, wherein the wireless communication system comprises at least one first femtocell and one neighboring second femtocell and at least one first mobile communications device camped on the first femtocell. The method comprises the steps of determining a first group corresponding to the first femtocell and a second group corresponding to the second femtocell according to at least one signal-to-interference ratio (SIR) of the first and second femtocells measured by the first mobile communications device and a threshold, wherein the first group includes the first mobile communications device and when the measured SIR of the first and second femtocells is less than the threshold, the first mobile communications device is included in the first group and the second group simultaneously, and the first and second groups form an allocation group, and sequentially performing a resource-allocation procedure on each group of the allocation group according to a specific allocation order.

In another aspect of the invention, in a wireless communication system with at least one first femtocell and one neighboring second femtocell, at least one first mobile communications device and a control node is provided. The first mobile communications device camps on the first femtocell. The control node is coupled on the first and second femtocells for performing data transmission and reception between the first and second femtocells. The first femtocell or the control node determines a first group corresponding to the first femtocell and a second group corresponding to the second femtocell, according to at least one SIR of the first and second femtocells measured by the first mobile communications device and a threshold. It sequentially performs a resource-allocation procedure on each group of an allocation group according to a specific allocation order; wherein the first group includes the first mobile communications device and when the measured SIR of the first and second femtocells which is measured by the first mobile communications device is less than the threshold, the first mobile communications device is included in the first group and the second group simultaneously and the first and second groups form the allocation group.

In yet another aspect of the invention, a method for resource allocation for use in a femtocell is provided. The method comprises the steps of transmitting a measurement request to at least one first mobile communications device. The measurement request indicates the first mobile communications device to measure at least one signal-to-interference ratio (SIR) of the femtocell and at least one other femtocell neighboring the femtocell, receiving a measurement report corresponding to the measurement request from the first mobile communications device. The measurement report includes the SIR of the femtocell and the neighboring femtocell measured by the first mobile communications device, determining a first group corresponding to the femtocell and a second group corresponding to the neighboring femtocell according to the SIR of the femtocell and the neighboring femtocell and a threshold. The first group includes the first mobile communications device and when the measured SIR of the first and second femtocells that is measured by the first mobile communications device is less than the threshold, the first mobile communications device is included in the first group and the second group simultaneously and the first and second groups form an allocation group, and sequentially performing a resource-allocation procedure on each group of the allocation group according to a specific allocation order.

In yet another aspect of the invention, a wireless communications device for performing measurement required for resource allocation with a wireless module and a controller module is provided. The wireless module performs wireless transmission and reception to and from a service network comprising at least one first femtocell, one second femtocell neighboring the first femtocell, and a control node. The controller module receives a measurement request from the first femtocell or the control node via the wireless module, requests the wireless module to detect a plurality of signal strengths respectively between the first femtocell and the second femtocell in response to the measurement request, obtains at least one signal-to-interference ratio (SIR) of the first and second femtocells measured by the mobile communications device, and transmits a measurement report. The measurement report includes the measured SIR of the first and second femtocells to the control node or the first femtocell via the wireless module such that the control node or the first femtocell determines whether to perform a group updating task according to the measured SIR of the first and second femtocells and a threshold. When the measured SIR of the first and second femtocells is less than the threshold, the controller module transmits a connection request to the first femtocell via the wireless module to request the second femtocell to perform the group updating task, and the first femtocell and the second femtocell simultaneously add the wireless communications device into a first group of the first femtocell and a second group of the second femtocell to perform a group-wised resource allocation.

In yet another aspect of the invention, a femtocell for performing resource allocation with a wireless module and a controller module is provided. The wireless module transmits a measurement request to at least one first mobile communications device, wherein the measurement request indicates the first mobile communications device to measure at least one signal-to-interference ratio (SIR) of the femtocell and at least one other femtocell neighboring the femtocell. The controller module receives a measurement report corresponding to the measurement request from the first mobile communications device via the wireless module, wherein the measurement report includes the SIR of the femtocell and the neighboring femtocell measured by the first mobile communications device, determines a first group corresponding to the femtocell and a second group corresponding to the neighboring femtocell according to the SIR of the femtocell and the neighboring femtocell and a threshold, and sequentially performs a resource-allocation procedure on each group of the allocation group according to a specific allocation order, wherein the first group includes the first mobile communications device. When the measured SIR of the first and second femtocells that is measured by the first mobile communications device is less than the threshold, the first mobile communications device is included in the first group and the second group simultaneously and the first and second groups form an allocation group.

Other aspects and features of the present invention will become apparent to those with ordinary skill in the art upon review of the following descriptions of specific embodiments of apparatuses and methods for resource allocation in a wireless communications system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Embodiments of the invention provide a cooperative group-based resource allocation (hereinafter referred to as GRA) method to resolve the aforementioned potential problem of interactive interference when femtocell (referred to as HNB) is in resource allocation. That is, to turn chain reactions of the interactive interference of all base stations into several groups that allow overlapping with each other, and to integrate the mobile communications device or the user equipment (UE) adjacent to the femtocell that was severely affected in its own group, so that the groups can serve as the objects to perform resource allocation, thereby improving the quality of indoor wireless communication. In some embodiments, based on the GRA of the invention, femtocells that can communicate with each other in the environment without a central control system may perform the resource allocation of each member of their own group, thus efficiently allocating resources. In other embodiments, the GRA method of the invention may easily utilize the UE returned signal measurement results of all base stations to determine the allocation group, and then sever the group as object to perform resource allocation with no need of complex operations in the environment with a central control system, effectively reducing the computational time required. In the GRA method of the invention, the size of the cooperative group may be determined by a threshold. As the threshold changes, the scope of cooperation and interactions among the groups immediately changes so that an appropriate threshold can be selected to speed up the computation and performance. Therefore, the resource allocation method of the invention can effectively reduce the outage rate, system throughput, and the computational time and is suitable for an urban area of intensive deployment.

In the embodiments, the mobile communications device or the users equipment (referred to as UE) can be utilized to measure the Signal-to-Interference Ratio (referred to as SIR) caused by different femtocells, or the HNBs to combine into several groups, in which, as long as a measured SIR was less than a certain threshold, the femtocell that caused the interference would need to include the UE into its group. In other words, if a certain UE has received a strong signal from the femtocell A and the femtocell B at the same time, the femtocell A and the femtocell B will be required to cooperate in the resource allocation.

Figure 1:
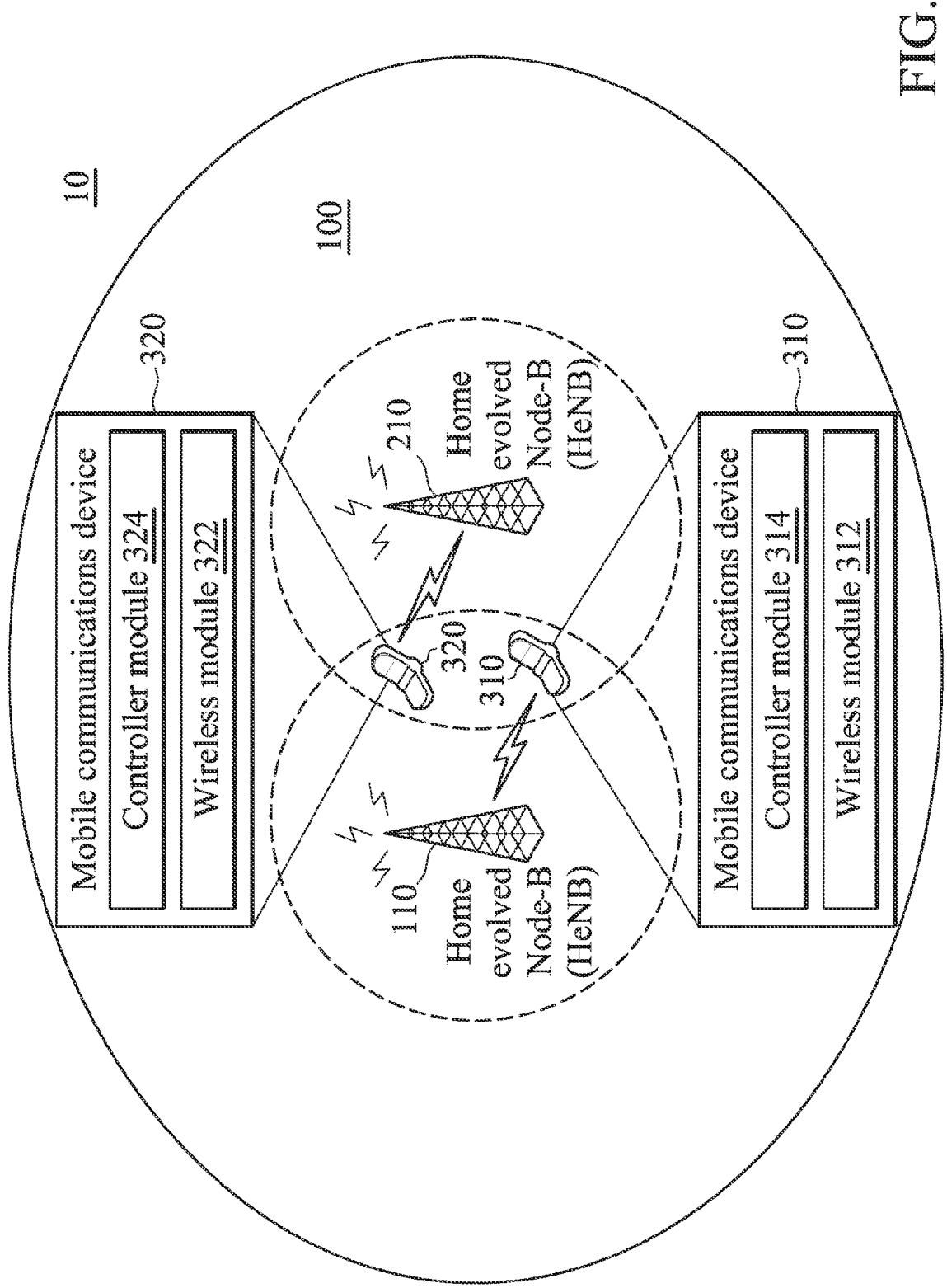
FIG. 1 is a block diagram illustrating a wireless communications system according to a UE-assisted embodiment of the invention.

FIG. 1 is a block diagram illustrating a wireless communications system according to a UE-assisted embodiment of the invention. In the wireless communications system 10, the mobile communications device 310 is wirelessly connected to a service network 100 via an air interface, and performs wireless transmission and reception to and from the service network 100.

The service network 100 comprises two home evolved Node-Bs (HeNB) 110 and 210, wherein the mobile communications device 310 first camps on the HeNB 110 while the mobile communications device 320 first camps on the HeNB 210 and the mobile communications devices 310 and 320 are both located within the coverage of the HeNBs 110 and 210. The mobile communications device 310 comprises a wireless module 312 for performing the functionality of wireless transmission and reception to and from the HeNB 110 or the HeNB 210. To further clarify, the wireless module 312 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, and convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system. Also, the mobile communications device 310 comprises a controller module 314 for controlling the operation of the wireless module 312 and other function components, such as a display unit and/or keypad serving as the MMI (man-machine interface), a storage unit storing the program codes of applications or communication protocols, or others. To be more specific, the controller module 314 controls the wireless module 312 to perform a cooperative group-based resource-allocation procedure of the invention.

Similarly, the mobile communications device 320 comprises a wireless module 322 for performing the functionality of wireless transmission and reception to and from the HeNB 110 or the HeNB 210 and a controller module 314 for controlling the wireless module 322 to perform the cooperative group-based resource-allocation procedure of the invention, which are similar to the wireless module 312 and the controller module 314. Similarly, the controller module 324 controls the wireless module 322 to perform the cooperative group-based resource-allocation procedure of the invention. It is noted that each of the HeNBs 110 and 210 may further comprise a wireless module (not shown) for performing the functionality of wireless transmission and reception, and a controller module (not shown) for controlling the operation of the wireless module and other functional components. It is understood that the mobile communications devices 310 and 320 and the service network 100 are embodiments of the invention, but the invention is not limited thereto. The invention can also be applied in mobile communications devices and service networks utilizing other radio access technologies (RATs), such as the Wideband Code Division Multiple Access (WCDMA) technology, Worldwide Interoperability for Microwave Access (WiMAX) technology, Universal Mobile Telecommunications System (UMTS) technology and others. In one embodiment, the service network 100 may be a WCDMA network and the mobile communications devices 310 and 320 may be UEs in compliance with the specifications of the WCDMA technology. In another embodiment, the service network 100 may be an LTE network and the mobile communications devices 310 and 320 may be UEs in compliance with the specifications of the LTE technology, and the invention is not limited thereto. It is to be noted that, for illustration purpose, in some embodiments, the mobile communications device may be referred to as a UE and the HeNB or HNB may be referred as a femtocell.

Figure 2A:
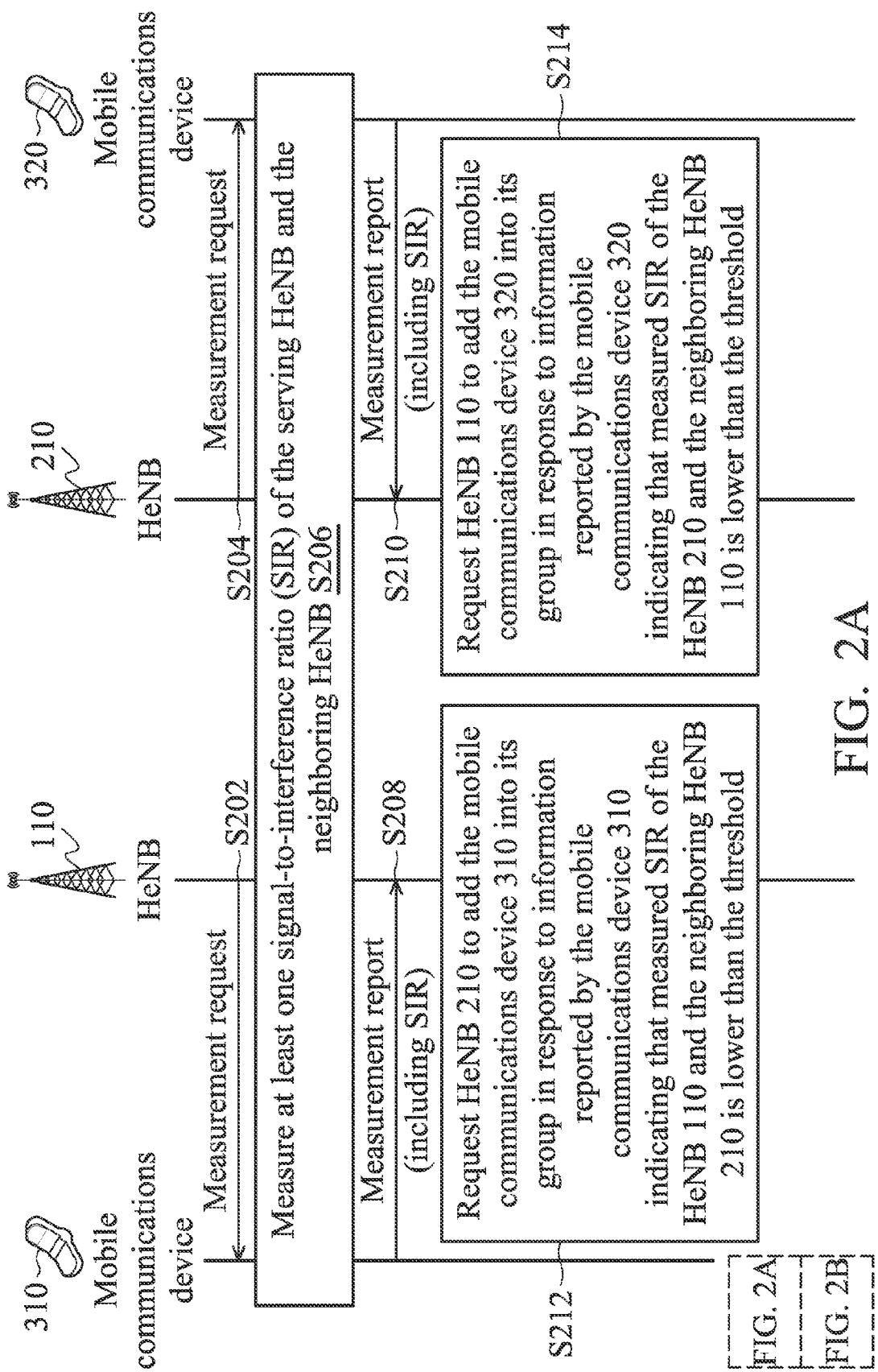
FIG. 2 is a message sequence chart illustrating a cooperative group-based resource allocation method according to the wireless communications system in FIG. 1 of the invention.
Figure 2B:
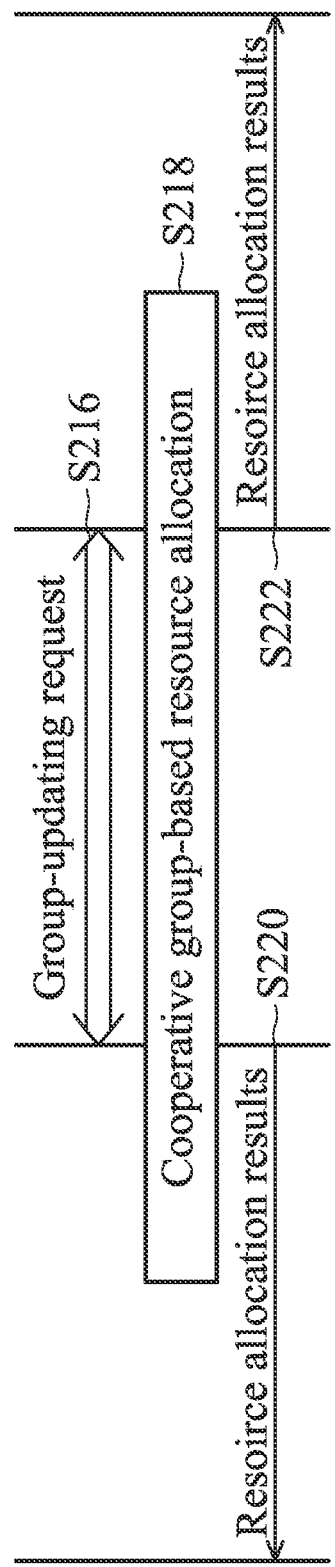

FIG. 2 is a message sequence chart illustrating a cooperative group-based resource allocation method according to the wireless communications system in FIG. 1 of the invention. In this embodiment, it is assumed that each HeNB has a responsive group, wherein members of the group are all UEs that are interfered with by the HeNB belonging to the group. Serving UEs are initial group members for each HeNB. As shown in FIG. 1, the mobile communications devices 310 and 320 are both in the coverage of the HeNBs 110 and 210 at the same time so that the mobile communications devices 310 and 320 may receive signals from the HeNBs 110 and 210 simultaneously. The mobile communications device 310 first camps on the HeNB 110 and then receives a measurement request from the HeNB 110 (step S202), wherein the measurement request indicates that a group-based resource allocation is required to perform and thus signal strength measurements on specific neighboring network nodes are requested. Upon reception of the measurement request, the controller module 314 requests the wireless module 312 to detect the signal strengths respectively of the HeNB 110 and the neighboring HeNB 210 and obtains at least one signal-to-interference ratio (SIR) of the HeNB 110 and the neighboring HeNB 210 (step S206). After the measurement is finished, the controller module 314 transmits a measurement report including the measured SIR of the HeNB 110 and the neighboring HeNB 210 to the HeNB 110 via the wireless module (step S208).

As the measurement report indicates that the measured SIR of the HeNB 110 and the neighboring HeNB 210 is lower than a predetermined threshold, this means that the mobile communications device 310 may be seriously interfered with by the HeNB 210 and thus the HeNB 210 must be informed to add/include the mobile communications device 310 into its group. Thus, the HeNB 110 transmits a group-updating request to inform the HeNB 210 to request the HeNB 210 add the mobile communications device 310 into its group in response to information reported by the mobile communications device 310 indicating that the measured SIR of the HeNB 110 and the neighboring HeNB 210 is lower than the threshold (steps S212, S216). Upon reception of the group-updating request, the HeNB 210 includes the mobile communications device 310 into its group. Thus, the group of the HeNB 210 will include the mobile communications device 310.

Similarly, the mobile communications device 320 first camps on the HeNB 210 and then receives a measurement request from the HeNB 210 (step S204), wherein the measurement request indicates that a group-based resource allocation is required to be performed, and thus signal strength measurements on specific neighboring network nodes are requested. Upon reception of the measurement request, the controller module 324 requests the wireless module 322 to detect the signal strengths of the HeNB 110 and the neighboring HeNB 210 respectively and obtains at least one SIR of the HeNB 210 and the neighboring HeNB 110 (step S206). After the measurement is finished, the controller module 324 transmits a measurement report including the measured SIR of the HeNB 210 and the neighboring HeNB 110 to the HeNB 210 via the wireless module (step S210). As the measurement report indicates that the measured SIR of the HeNB 210 and the neighboring HeNB 110 is lower than the predetermined threshold, this means that the mobile communications device 320 may be seriously interfered with by the HeNB 110 and thus the HeNB 110 must be informed to add/include the mobile communications device 320 into its group. Thus, the HeNB 210 transmits a group-updating request to inform the HeNB 110 to request the HeNB 110 to add the mobile communications device 320 into its group in response to information reported by the mobile communications device 320 indicating that the measured SIR of the HeNB 210 and the neighboring HeNB 110 is lower than the threshold (steps S214, S216). Upon reception of the group-updating request, the HeNB 110 includes the mobile communications device 320 into its group. Thus, the group of the HeNB 110 will include the mobile communications device 320.

It is to be understood that, although only one neighboring femtocell is illustrated as an example in this embodiment, the invention is not limited thereto. In some embodiments, when in an environment having a plurality of femtocells, the mobile communications device 310 may measure SIRs of the HeNB 110 and all of the neighboring HeNBs respectively and inform specific neighboring HeNBs which are seriously interfered with the HeNB 110 to add the mobile communications device 310 into its group via the HeNB 110 when a measurement report for any specific neighboring HeNB indicates that the measured SIR of the HeNB 110 and the specific neighboring HeNB is lower than the predetermined threshold. In other words, the mobile communications device 310 can overlap and include responsive groups of a plurality of interfering HeNBs. Regarding the detailed calculations of the SIR and group formations, references may be made to the related descriptions of FIGS. 3 and 4.

Figure 3:
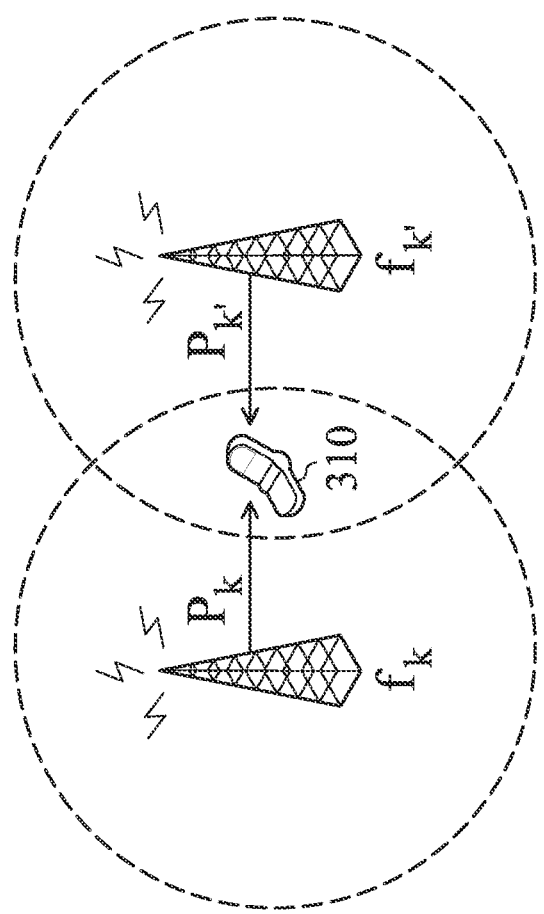
FIG. 3 is a schematic diagram illustrating a wireless communications system arrangement according to an embodiment of the invention.

FIG. 3 is a schematic diagram illustrating a wireless communications system arrangement according to an embodiment of the invention. As shown in FIG. 3, the mobile communications device 310 is within the coverage of the femtocells $f_k$ and $f_{k'}$ at the same time so that the mobile communications device 310 may receive signals from the femtocells $f_k$ and $f_{k'}$ simultaneously. The mobile communications device 310 thus obtains an SIR of the femtocells $f_k$ and $f_{k'}$, $SIR_{k,k'}$ based on the signal strength $P_k$ received from the femtocell $f_k$ and the signal strength $P_{k'}$ received from the femtocell $f_{k'}$. The $SIR_{k,k'}$ can be defined as $SIR_{k,k'}=P_k/P_{k'}$. In this embodiment, if the calculated SIR of the femtocells $f_k$ and $f_{k'}$, $SIR_{k,k'}$ is lower than the threshold, this means that the mobile communications device 310 simultaneously receives strong signals from both the femtocells $f_k$ and $f_{k'}$ and may be seriously interfered with by the femtocell $f_{k'}$, thus the femtocell $f_{k'}$ has to be taken into account jointly for resource allocation. Therefore, the mobile communications device 310 will be added into the group of the femtocells $f_{k'}$. Similarly, in another embodiment, if the calculated SIR of the femtocells $f_k$ and $f_{k''}$, $SIR_{k,k''}$ is lower than the threshold, this means that the mobile communications device 310 simultaneously receives strong signals from both the femtocells $f_k$ and $f_{k''}$ and may be seriously interfered with by the femtocell $f_{k''}$, thus the femtocell $f_{k''}$ has to be taken into account jointly for resource allocation. Therefore, the mobile communications device 310 will be added into the group of the femtocells $f_{k''}$. In other words, when the resource-allocation procedure is to be performed on the mobile communications device 310, the femtocells $f_k$, $f_{k'}$ and $f_{k''}$ will form an allocation group to cooperatively perform the resource allocation on all the UEs of the groups of femtocells $g_k$, $g_{k'}$, and $g_{k''}$.

Figure 4:
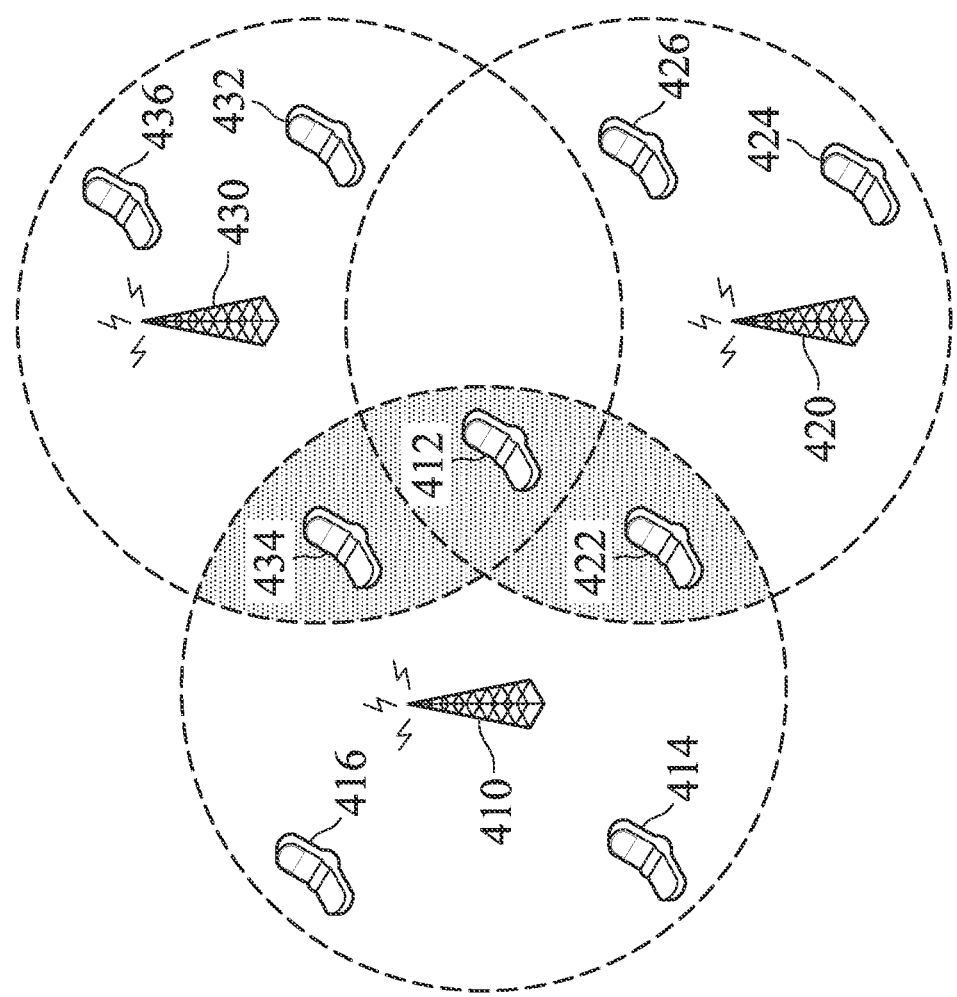
FIG. 4 is a schematic diagram illustrating another wireless communications system arrangement according to another embodiment of the invention.

FIG. 4 is a schematic diagram illustrating another wireless communications system arrangement according to another embodiment of the invention. In this embodiment, for illustration purpose, the mobile communications device may be referred to as a UE and the HeNB or HNB may be referred as a femtocell. As shown in FIG. 4, the wireless communications system include three HeNBs 410, 420 and 430, wherein the HeNB 410 comprises UEs 412, 414 and 416, the HeNB 420 comprises UEs 422, 424 and 426 and the HeNB 430 comprises UEs 432, 434 and 436. Serving UEs are initial group members for each HeNB. Thus, the members of the group $g_{410}$ corresponding to the HeNB 410 are {412, 414, 416}, the members of the group $g_{420}$ corresponding to the HeNB 420 are {422, 424, 426} and the members of the group $g_{430}$ corresponding to the HeNB 430 are {432, 434, 436}. In this embodiment, as shown in FIG. 4, the UE 412 is in the coverage of the HeNBs 410, 420 and 430, the UE 422 is in the coverage of the HeNBs 410 and 420, and the UE 434 is in the coverage of the HeNBs 410 and 430. As the UE 412 is in the coverage of the HeNBs 420 and 430, it may be seriously interfered with by the HeNBs 420 and 430 and thus the UE 412 will be added into the group $g_{420}$ of the HeNB 420 and the group $g_{430}$ of the HeNB 430. Similarly, as the UEs 422 and 434 are both in the coverage of the HeNB 410, they may be seriously interfered with by the HeNB 410 and thus the UEs 422 and 434 will be added into the group $g_{410}$ of the HeNB 410. As the UE 412 is in the coverage of the HeNB 430, it may be seriously interfered with by the HeNB 430 and thus the UE 412 will be added into the group $g_{430}$ of the HeNB 430. Therefore, after information of the neighboring HeNBs have been updated, the members of the group $g_{410}$ corresponding to the HeNB 410 become {412, 414, 416, 422, 434}, the members of the group $g_{420}$ corresponding to the HeNB 420 become {412, 422, 424, 426} and the members of the group $g_{430}$ corresponding to the HeNB 430 become {412, 432, 434, 436}. Because the UE 434 is both in the group $g_{410}$ and the group $g_{430}$ at the same time, when the resource-allocation procedure is to be performed on the UE 434, the HeNBs 410 and 430 must cooperatively perform the resource allocation, which means that the groups $g_{410}$ and $g_{430}$ will form an allocation group. Similarly, because the UE 422 is both in the group $g_{410}$ and the group $g_{420}$ at the same time, when the resource-allocation procedure is to be performed on the UE 422, the HeNBs 410 and 420 must cooperatively perform the resource allocation, which means that the groups $g_{410}$ and $g_{420}$ will form an allocation group while the HeNBs 410, 420 and 430 must cooperatively perform the resource allocation, which means that the groups $g_{410}$, $g_{420}$ and $g_{430}$ will form an allocation group, when the resource-allocation procedure is to be performed on the UE 434 since the UE 412 is in the groups $g_{410}$, $g_{420}$ and $g_{430}$ at the same time.

Referring back to FIG. 2, as the mobile communications device 310 is the group member of both the groups of the HeNBs 110 and 210, the HeNBs 110 and 210 have to cooperatively allocate resource to the mobile communications device 310. Similarly, as the mobile communications device 320 is the group member of both the groups of the HeNBs 210 and 110, the HeNBs 210 and 110 have to cooperatively allocate resource to the mobile communications device 320.

Therefore, the HeNB 110 and the HeNB 210 then perform the above-mentioned cooperative group-based resource allocation (step S218) to cooperatively perform the resource allocation on the mobile communications devices 310 and 320 according to the available resources of the HeNBs 110 and 210 and after the allocation is finished, transmit the resource allocation results to the mobile communications devices 310 and 320, respectively (steps S220, S222). Detail descriptions of steps of cooperative group-based resource allocation method are described in the following.

In this embodiment, the GRA method is to have the group perform the resource allocation as a unit, and each group subsequently can perform its own resource allocation based on the size of the detected groups and then transfer the resource allocation results to the groups around to update. Note that the order of the group allocation is to start with the largest group (i.e., the group with a local maximum of the number of group members). This principle allows the highest use of regional resources. In addition, the principle of resource allocation to the UE is that unmet minimum transmission conditions have a higher priority, and extra resources should be used to perform the additional allocation. If the available resource is not enough to meet the needs of any UE within the group, the femtocell of the group is allowed to request the femtocells around to abandon the use of resources that have been allocated but not for meeting the minimum resource requirements for its members (UE), and in turn assign them to the UE within the group to meet the minimum resource requirements. Finally, in step S610, the femtocell updates the information of the allocation results to each UE within its group, instructing each UE which resources to use to communicate, and at the same time updates the information of allocation results to the neighboring femtocells. Other neighboring femtocell groups that have not yet completed the resource allocation may refer to the allocation results of this femtocell to continue subsequent resource allocation in sequence according to the above said principle. After the resource allocation of the largest group around is finished, the other groups that have not been allocated may perform the resource allocation based on the aforesaid principle in sequence.

Each group must pay attention to two things. First, assuming that other neighboring femtocells have reserved a share of resources to a user, then that femtocell shall also retain its share of resources to its user in order to avoid reusing resources and thereby reducing the outage rate. Moreover, in order to ensure the system throughput has good performance, in some embodiments, the invention further indicates the resource allocation as an essential primary resource and an additional allocation of non-essential secondary resource. Specifically, the primary resource is the resource allocation that complies with the minimum resource demand of each UE, and the secondary resource is the remaining available resources after all the UEs have been allocated resources to meet the minimum demand. For example, assume that a UE's minimum resource requirements are two resource blocks (RB), and after resource allocation the UE can use three resource blocks RB1, RB2, RB3, two of which RB1, RB2 will be marked as primary resources, while resource block RB3 will be marked as a secondary resource, and this additional resource is used to provide better performance. Assuming the HNB finds itself lacking resources to give to the UEs in its group, the HNB can then demand the resource block (like the resource block RB3 in the previous example) that was originally designated but belongs to secondary resource as its primary resource, in order to meet the minimum resource requirements of the UE inside the group.

To be more specific, the cooperatively GRA method of the invention may further be separated into three steps: initializing, measuring and allocating steps. First, femtocells and UEs start from the initializing step for initialization for every allocation cycle. Then, UEs measure the received SIR value and update the measured SIR value to neighboring femtocells in the measuring step to establish cooperation relations. Groups will be formed based on the updated SIR information, and then resource allocation can be done group by group.

For example, in one embodiment, assume that there are K femtocells in the service network, wherein each femtocell comprises M mobile communications devices or UEs in service and N resource blocks (RBs) can be used in total. The following sets will be established and initialized during the initializing step, including a RB set R, a user set U, a femtocell set F, a cooperative group set G, a minimum resource requirement set (such as a minimum QoS (Quality of Service) set) Q and a demanded resource set D. The RB set R is represented as $R_{1 \times N} = \{r_1, \ldots, r_N\}$, wherein $r_n$ represents the $n^{th}$ RB. The user set U is represented as $U_{K \times m} = \{u_{1,1}, \ldots, u_{1,M}, u_{2,1}, \ldots, u_{K,M}\}$, wherein $u_{k,m}$ represents $m^{th}$ user of $k^{th}$ femtocell. The elements in $u_{k,m}$ are the RBs which have been allocated to $u_{k,m}$. For example, $u_{k,m} = \{r_2, r_3\}$ means that $u_{k,m}$ is allowed to use RBs $r_2$ and $r_3$. The femtocell set F is represented as $F_{1 \times K} = \{f_1, \ldots, f_K\}$, wherein $f_k$ represents the $k^{th}$ femtocell subset. For example, $f_1$ represents the subsets of the first femtocell. The elements in $f_k$ are the RBs which have been allocated to $f_k$. For example, $f_k = \{r_2, r_3\}$ represents that users in a group set $g_k$ have been allowed to use RBs $r_2$ and $r_3$. The group set $g_k$ is described below.

The cooperative group set G is represented as $G_{1 \times K} = \{g_1, \ldots, g_K\}$, wherein $g_k$ represents a subset containing users influenced by the $n^{th}$ RB. In the initializing step, $g_k = \{u_{k,1}, \ldots, u_{k,M}\}$. The subset $g_k$ in G represents the UEs that the femtocell $f_k$ needs to allocate resource cooperatively. In other words, the elements in $g_k$ are the UEs that the femtocell $f_k$ needs to be cooperative when other femtocells are going to assign channel to any one of them. For example, if the UE $u_{2,1}$ of the femtocell $f_2$ is included in the group set $g_1$ corresponding to the femtocell $f_1$, the femtocell $f_1$ and the femtocell $f_2$ have to cooperatively perform the resource allocation on the UE $u_{2,1}$ when the femtocell $f_2$ is going to assign channel to the UE $u_{2,1}$.

The minimum resource requirement set Q is represented as $Q_{K \times M} = \{q_{1,1}, \ldots, q_{1,M}, q_{2,1}, \ldots, q_{K,M}\}$, wherein $q_{k,m}$ represents the minimum QoS requirement of the $m^{th}$ user in $k^{th}$ femtocell. For example, $q_{k,m} = \{2\}$ represents that user $u_{k,m}$ at least requires two RBs. The demanded resource set D is represented as $D_{K \times M} = \{d_{1,1}, \ldots, d_{1,M}, d_{2,1}, \ldots, d_{K,M}\}$, wherein $d_{k,m}$ represents the required resource number of the $m^{th}$ UE in $k^{th}$ femtocell. For example, $d_{k,m} = \{2\}$ represents that $u_{k,m}$ requires two channel RBs.

In some embodiments, a threshold may further be used to determine whether the cooperatively resource allocation is required, but the invention is not limited thereto. The threshold may be determined by, for example, a calculated QoS range and the invention is not limited thereto. When a SIR measured by a specific UE from the neighboring femtocell is lower than the threshold, which means that it may be seriously interfered with by this neighboring femtocell, then the specific UE is added to subset set $g_k$ of the neighboring femtocell. In other words, if the measured SIR of the femtocell $f_k$ to the femtocell $f_{k'}$ measured by the UE $u_{k',m}$ is lower than the threshold, when performing the resource allocation, the femtocell $f_k$ has to take the user $u_{k',m}$ into account jointly. The goal of GRA of the invention is to make every femtocell avoid allocating the same channels which have been allocated by the neighboring femtocells (particularly to those neighboring femtocells which are cross-interfered with) to their users. If the UE $u_{k,m}$ in the femtocell $f_k$ measures the SIR of its neighboring femtocell $f_{k'}$ lower than a threshold, the UE $u_{k,m}$ must be added to the group of the neighboring femtocell $f_{k'}$ to become one of the members of the group corresponding to the neighboring femtocell $f_{k'}$.

Figure 5:
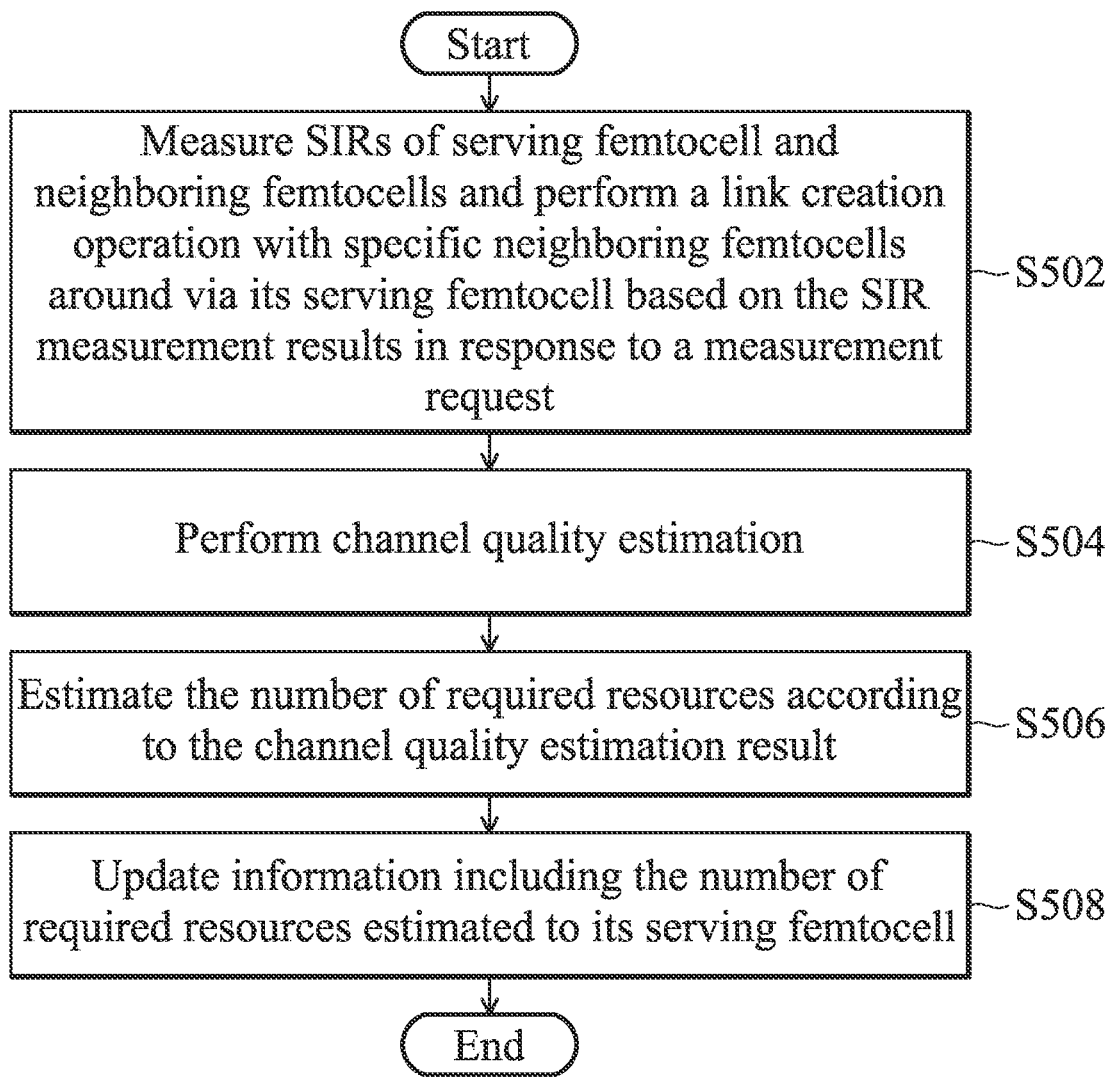
FIG. 5 is a flow chart illustrating a method for performing signal measurement needed for resource allocation according to the UE-assisted embodiment in FIG. 1.

FIG. 5 is a flow chart illustrating a method for performing signal measurement needed for resource allocation according to the UE-assisted embodiment in FIG. 1.

In step S502, each UE performs a signal measurement on the serving femtocell and neighboring femtocells to obtain the SIRs of the serving femtocell and the neighboring femtocells and performs a link creation operation with specific neighboring femtocells around based on the SIR measurement results via its serving femtocell in response to a measurement request. In other words, each UE will sent a link request to the interfering neighboring femtocells to request to be added into the groups of these interfering femtocells based on the SIR measurement results. After the link is established, in step S504, the UE performs channel quality estimation and in step S506, estimates the number of required resources according to the channel quality estimation result. For example, UE $u_{k,m}$ may perform a channel quality estimation to obtain current resource allocation statuses of the femtocells corresponding to all the groups that include the UE $u_{k,m}$ and calculate the number of required resources $d_{k,m}$ according to the obtained current resource allocation statuses of the femtocells and their minimum resource requirement $q_{k,m}$. After the number of required resources $d_{k,m}$ is calculated, in step S508, the UE updates the information including the number of required resources estimated to its serving femtocell.

After all of the updating information including the calculated required resource number $d_{k,m}$ sent by all of the UEs have been received, the serving femtocell performs the cooperative group-based resource allocation operation according to the required resource number $d_{k,m}$ calculated by all of the UEs and then sends the resource allocation result back to the UE and updates it to other neighboring femtocells. Therefore, the UE will communicate with the femtocell using the assigned/allocated RBs based on the resource allocation result. In some embodiments, the UE may transmit the measured information to the serving femtocell and the interfering femtocells at the same time.

After the initializing and measuring steps have been finished, all subsets $g_k$ have been completely updated with neighboring user's information of the neighboring femtocells. For case that $u_{k,m}$ is one of the members in $g_k$ and $g_{k'}$, femtocells K and K' need to allocate channels to user $u_{k,m}$ cooperatively. In the GRA of the invention, the allocation starts from the group with the local maximum number of group members among the surrounding femtocells of group set $g_k$.

In some embodiments, the above-mentioned GRA method of the invention can be performed by following steps: (1) Create a set W containing all groups with local maximum size of group members; (2)
For each group $g_k$ in W, allocated $q_{k,m}$ number of $r_n$ to $u_{k,m}$ in $g_k$ according to the recent allocation condition of set $f_{k'}$, where $f_{k'}$ is the corresponding femtocell to any $g_{k'}$ contains $u_{k,m}$. When not enough remaining available resource $r_n$ to support $q_{k,m}$, randomly allocate assigned secondary resource $r_n$ until $q_{k,m}$ reached or no available secondary resource $r_n$ anymore. Meanwhile, set the allocated rn=1; (3) For each group $g_k$ in W, allocated the remaining available resource $r_n$ in $R_{1\times N}$ uniformly to $u_{k,m}$ according to the recent allocation condition of set $f_{k'}$ and set the allocated $r_n$=0; and (4) perform information updating: for any $r_n$ assigned to $u_{k,m}$ in $g_k$, $u_{k,m} \leftarrow u_{k,m} \cup \{r_n\}$, $f_k \leftarrow f_k \cup \{r_n\}$, $g_k \leftarrow g_k / \{u_{k,m}\}$.

Figure 6:
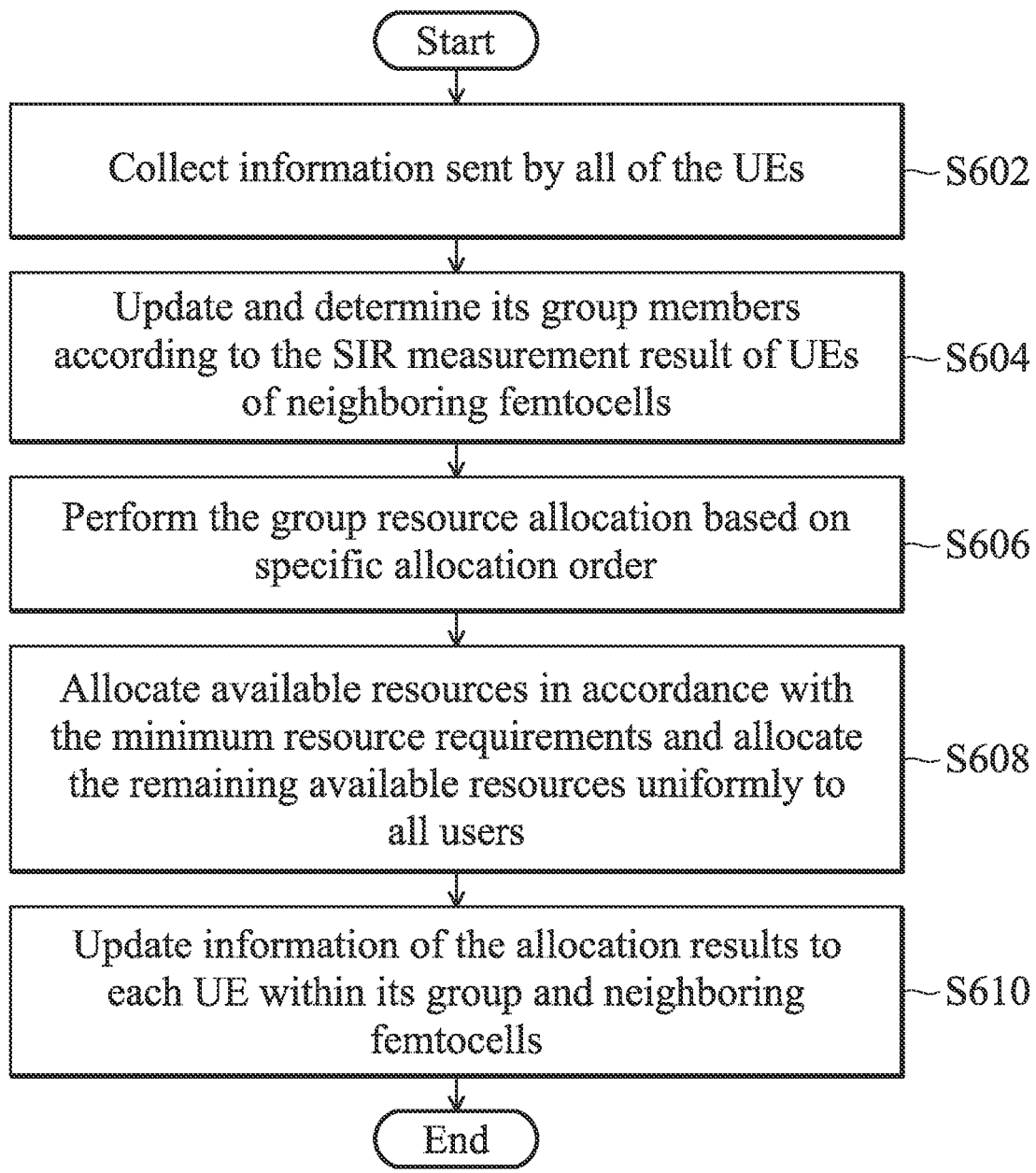
FIG. 6 is a flow chart illustrating a method for performing resource allocation according to the femtocell-assisted embodiment in FIG. 1.

FIG. 6 is a flow chart illustrating a method for performing resource allocation according to the Femtocell-assisted embodiment in FIG. 1. In step S602, the femtocell collects information sent by all of the UEs. Then, in step S604, the femtocell updates and determines its group members according to the SIR measurement result of the UEs of neighboring femtocells. In some embodiments, the SIR measurement result of a UE of the neighboring femtocell may be sent by the serving femtocell of the UE or sent by the UE directly. For example, for the femtocell $f_k$, if any measurement report of the UE $u_{k',m}$ of the neighboring femtocell $f_{k'}$ indicates that the measured SIR of the femtocell $f_{k'}$ to the femtocell $f_k$ is lower than the threshold, which means that it may be seriously interfered with by the femtocell $f_k$, then the UE $u_{k',m}$ is added to group $g_k$ of the femtocell $f_k$. In other words, when performing the resource allocation, the femtocell $f_k$ has to take the user $u_{k',m}$ into account jointly. Therefore, step S604 will add all UEs that were interfered with by the femtocell $f_k$ to the group $g_k$. After the group members of all the groups have been determined, in step S606, the femtocell starts performing the group resource allocation based on the GRA of the invention and the specific allocation order. As mentioned before, the femtocell performs the resource allocation based on the specific allocation sequence which may be performed by determining the allocation sequence based on the detected size of the surrounding groups. The group with the local maximum number of group members among the surrounding femtocells of group set $g_k$ has the highest priority of allocation, followed by the group with the second-largest local number of members, and so on. All groups may perform the resource allocation with its members (i.e.: UEs) based on this specific allocation sequence. It is to be noted that, if a certain femtocell finds itself not in a group of the local maximum number of group members, it may wait until all the surrounding groups with a larger number of group members have completed their resource allocation before it can perform its own resource allocation. In addition, in this step, the femtocell may allocate the available resources in accordance with the minimum resource requirements and allocate the remaining available resources uniformly to all users (step S608). To be more specific, the femtocell will allocate resources that meet the minimum resource requirements of all UEs to all the UEs in the group. When the resources of all UEs are allocated to meet the minimum resource requirements and available channel resources still remain, the femtocell may uniformly allocate the remaining available channel resources to all users. Note that the resource to meet the minimum resource requirements is also known as the primary resource, while the remaining available resource is referred to as the secondary resource. In addition, the principle of resource allocation is that the UEs that do not meet their unmet minimum transmission conditions have a higher priority for extra resources to perform the additional allocation. If the available resource is not enough to meet the needs of any UE within the group, the femtocell of the group is allowed to request the femtocells around to abandon the use of resources (i.e. the secondary resource that has been allocated $r_n$=0) that have been allocated but not for meeting the minimum resource requirements for its members (UE), and in turn assign them to the UE within the group to meet the minimum resource requirements. Finally, in step S610, the femtocell updates the information of the allocation results to each UE within its group, instructing each UE which resources to use to communicate, and at the same time updates the information of allocation results to the neighboring femtocells. Other neighboring femtocell groups that have not yet completed the resource allocation may refer to the allocation results of this femtocell to continue subsequent resource allocation in sequence according to the above said principle.

As the aforesaid resource allocation is to the UEs of groups of the femtocell as unit instead of the UE it serves, and the UEs in the group may cross multiple neighboring femtocells with interactive interference, the resource allocation of those UEs linked to more than one femtocell at the same time will not be used repeatedly, while the allocated resources of the UEs in non-overlapping regions of the neighboring femtocells can be repeatedly used, thus reducing the outage rate and achieving better system data traffic. It is noted that, although not illustrated therein, each of the HeNBs 110 and 120 may include a wireless module for performing wireless transmission and reception to and from a service network and may also include a controller module for processing the above described method for performing the resource allocation method according to the Femtocell assisted by the Femtocell in this embodiment.

It is understood that, in the above-mentioned embodiments, arbitration of the GRA can be achieved by the femtocell itself without assistance by another centralized control system. In other embodiments, all of the femtocells may further connect to a control node, such as a control node on an LTE Self Organizing Network (SON), and all of the femtocells may jointly report to this control node to achieve the GRA such that the control node can perform the arbitration of the GRA.

Figure 7:
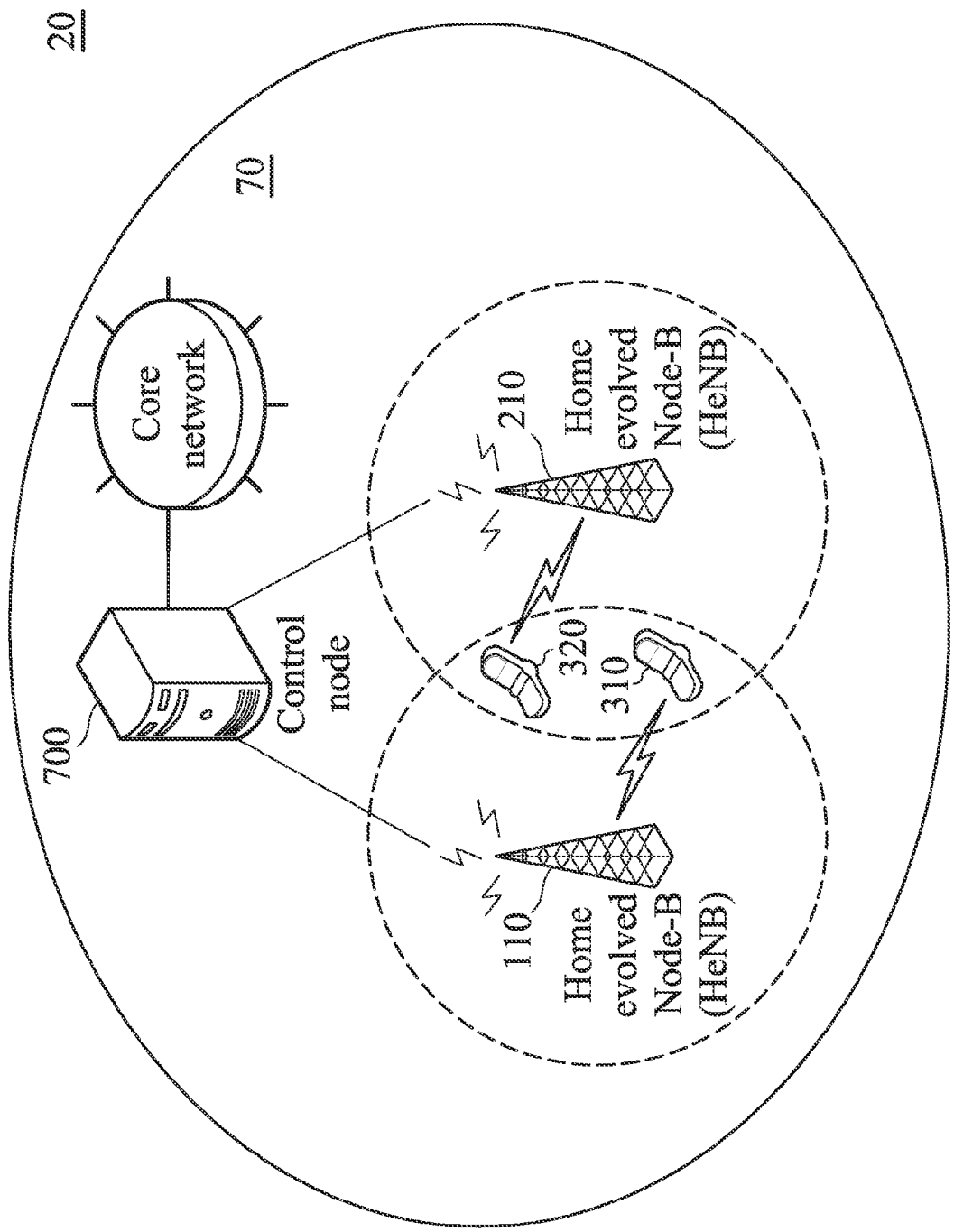
FIG. 7 is a block diagram illustrating a wireless communications system according to another UE-assisted embodiment of the invention.

FIG. 7 is a block diagram illustrating a wireless communications system according to another UE-assisted embodiment of the invention. In the wireless communications system 20, the mobile communications device 310 is wirelessly connected to a service network 70 via an air interface, and performs wireless transmission and reception to and from the service network 70. The service network 70 comprises two HeNB 110 and 210, wherein the mobile communications device 310 first camps on the HeNB 110 while the mobile communications device 320 first camps on the HeNB 210 and the mobile communications devices 310 and 320 are both located within the coverage of the HeNBs 110 and 210. The wireless communications system 20 is similar to the wireless communications system 10 of FIG. 1, except that the HeNB 110 and the HeNB 210 may further connect to a control node 700 (such as a control node on an LTE SON) and thus may performs wireless transmission and reception between the HeNB 110 and the HeNB 210 through the control node 700. The control node 700 is further connected to a core network. Similarly, the mobile communications device 310 comprises a wireless module 312 for performing the functionality of wireless transmission and reception to and from the HeNB 110 or the HeNB 210 and a controller module 314 for controlling the operation of the wireless module 312 and other function components, such as a display unit and/or keypad serving as the MMI (man-machine interface), a storage unit storing the program codes of applications or communication protocols, or others. To be more specific, the controller module 314 controls the wireless module 312 to perform a cooperative group-based resource-allocation procedure of the invention. Similarly, the mobile communications device 320 comprises a wireless module 322 for performing the functionality of wireless transmission and reception to and from the HeNB 110 or the HeNB 210 and a controller module 324 for controlling the wireless module 322 to perform the cooperative group-based resource-allocation procedure of the invention, which are similar to the wireless module 312 and the controller module 314. Similarly, the controller module 324 controls the wireless module 322 to perform the cooperative group-based resource-allocation procedure of the invention. In this embodiment, when performing the GRA, the HeNB 110 and the HeNB 210 will upload the measurement result to the control node 700 simultaneously so that the control node 700 may determine the group members of the HeNB 110 and the HeNB 210 and then send back the determination result to the HeNB 110 and the HeNB 210 for updating and perform subsequent cooperative GRA. It is noted that the control node 700 may further comprise a wireless module (not shown) for performing the functionality of wireless transmission and reception, and a controller module (not shown) for controlling the operation of the wireless module and other functional components.

Figure 8A:
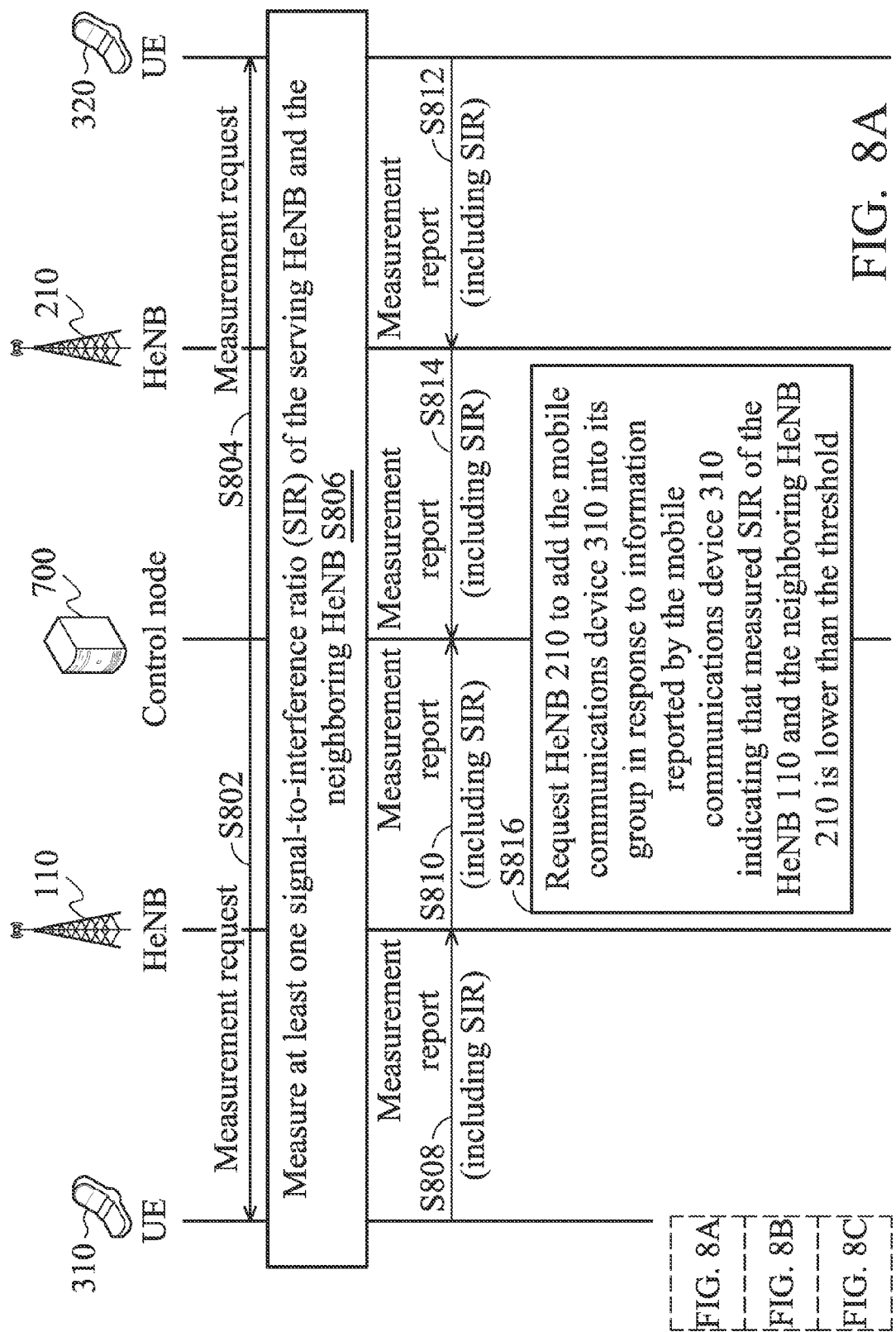
FIGS. 8A and 8B are message sequence charts illustrating a cooperative group-based resource allocation method according to the wireless communications system in FIG. 7 of the invention.
Figure 8B:
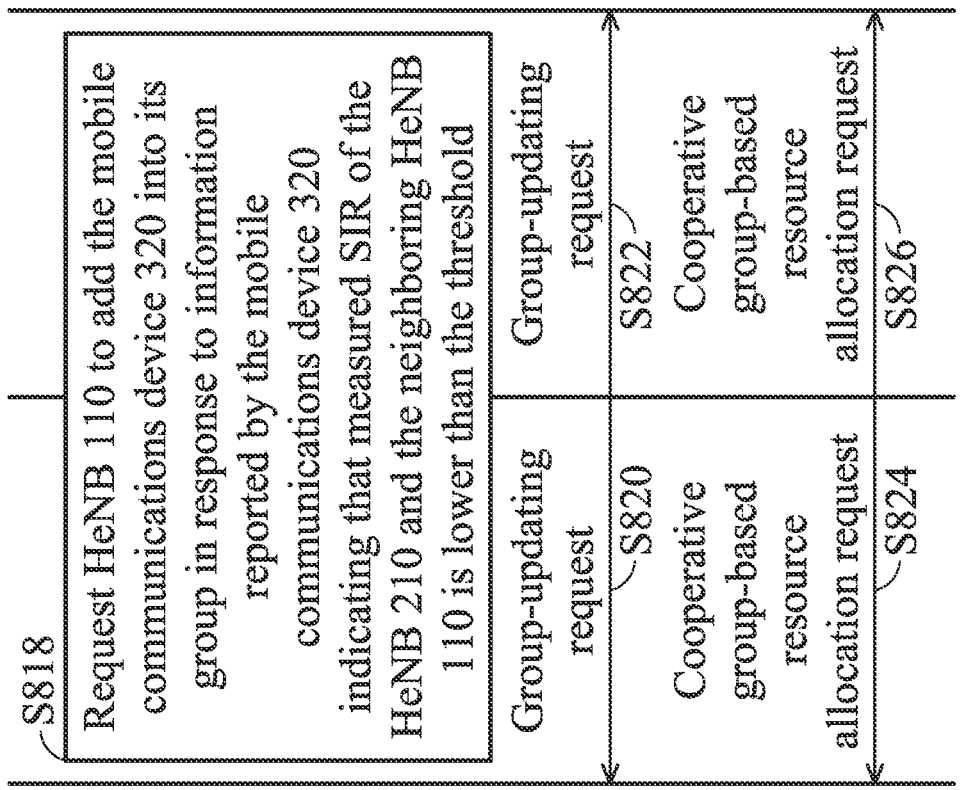
Figure 8C:
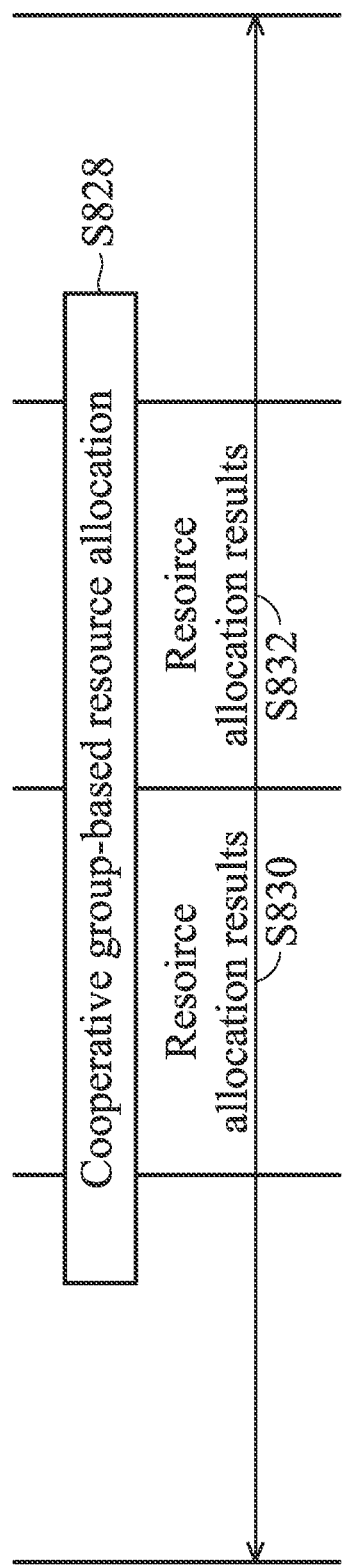

FIGS. 8A and 8B are message sequence charts illustrating a cooperative group-based resource allocation method according to the wireless communications system in FIG. 7 of the invention. In this embodiment, it is assumed that each HeNB has a responsive group, wherein members of the group are all UEs that are interfered with by the HeNB belonging to the group. Serving UEs are initial group members for each HeNB. As shown in FIG. 7, the mobile communications devices 310 and 320 are both in the coverage of the HeNBs 110 and 210 at the same time so that the mobile communications devices 310 and 320 may receive signals from the HeNBs 110 and 210 simultaneously. The mobile communications device 310 first camps on the control node 711 via the HeNB 110 and then receives a measurement request from the control node 700 via the HeNB 110 (step S802), wherein the measurement request indicates that a group-based resource allocation is required to perform and thus signal strength measurements on specific neighboring network nodes are requested. Upon reception of the measurement request, the controller module 314 requests the wireless module 312 to detect the signal strengths respectively of the HeNB 110 and the neighboring HeNB 210 and obtains at least one SIR of the HeNB 110 and the neighboring HeNB 210 (step S806). After the measurement is finished, the controller module 314 transmits a measurement report including the measured SIR of the HeNB 110 and the neighboring HeNB 210 to the HeNB 110 via the wireless module 312 (step S808). Upon reception of the measurement request from the mobile communications device 310, the HeNB 110 forwards the measurement report to the control node 700 (step S810). As the measurement report indicates that the measured SIR of the HeNB 110 and the neighboring HeNB 210 is lower than a predetermined threshold, this means that the mobile communications device 310 may be seriously interfered with by the HeNB 210 and thus the HeNB 210 must be informed to add/include the mobile communications device 310 into its group. Thus, the control node 700 transmits a group-updating request to inform the HeNB 210 to request the HeNB 210 add the mobile communications device 310 into its group in response to information reported by the mobile communications device 310 indicating that the measured SIR of the HeNB 110 and the neighboring HeNB 210 is lower than the threshold (steps S816, S820). Upon reception of the group-updating request from the control node 700, the HeNB 210 includes the mobile communications device 310 into its group. Thus, the group of the HeNB 210 will include the mobile communications device 310.

Similarly, the mobile communications device 320 first camps on the control node 700 via the HeNB 210 and then receives a measurement request from the control node 700 via the HeNB 210 (step S804) and performs signal strength measurements on specific neighboring network nodes. Upon reception of the measurement request, the controller module 324 requests the wireless module 322 to detect the signal strengths of the HeNB 210 and the neighboring HeNB 110 respectively and obtains at least one SIR of the HeNB 210 and the neighboring HeNB 110 (step S806). After the measurement is finished, the controller module 324 transmits a measurement report including the measured SIR of the HeNB 210 and the neighboring HeNB 110 to the HeNB 210 via the wireless module 322 (step S812). Upon reception of the measurement request from the mobile communications device 320, the HeNB 210 forwards the measurement report to the control node 700 (step S814). As the measurement report indicates that the measured SIR of the HeNB 210 and the neighboring HeNB 110 is lower than the predetermined threshold, this means that the mobile communications device 320 may be seriously interfered with by the HeNB 110 and thus the HeNB 110 must be informed to add/include the mobile communications device 320 into its group. Thus, the control node 700 transmits a group-updating request to inform the HeNB 110 to request the HeNB 110 to add the mobile communications device 320 into its group in response to information reported by the mobile communications device 320 indicating that the measured SIR of the HeNB 210 and the neighboring HeNB 110 is lower than the threshold (steps S818, S820). Upon reception of the group-updating request from the control node 700, the HeNB 110 includes the mobile communications device 320 into its group. Thus, the group of the HeNB 110 will include the mobile communications device 320.

As the mobile communications device 310 is the group member of both the groups of the HeNBs 110 and 210, the HeNBs 110 and 210 have to cooperatively allocate resource to the mobile communications device 310. Similarly, as the mobile communications device 320 is the group member of both the groups of the HeNBs 210 and 110, the HeNBs 210 and 110 have to cooperatively allocate resource to the mobile communications device 320.

Therefore, the control node 700 transmits a cooperative group-based resource allocation request to the HeNB 110 and the HeNB 210 to request for performing the above-mentioned cooperative group-based resource allocation (steps S824, S826) to cooperatively perform the resource allocation on the mobile communications devices 310 and 320 according to the available resources of the HeNBs 110 and 210 (step S828). After the allocation is finished, the control node 700 transmits the resource allocation results to the mobile communications devices 310 and 320, respectively (steps S830, S832). Detail descriptions of steps of cooperative group-based resource allocation method are mentioned-above and thus are omitted here for brevity.

Figure 9:
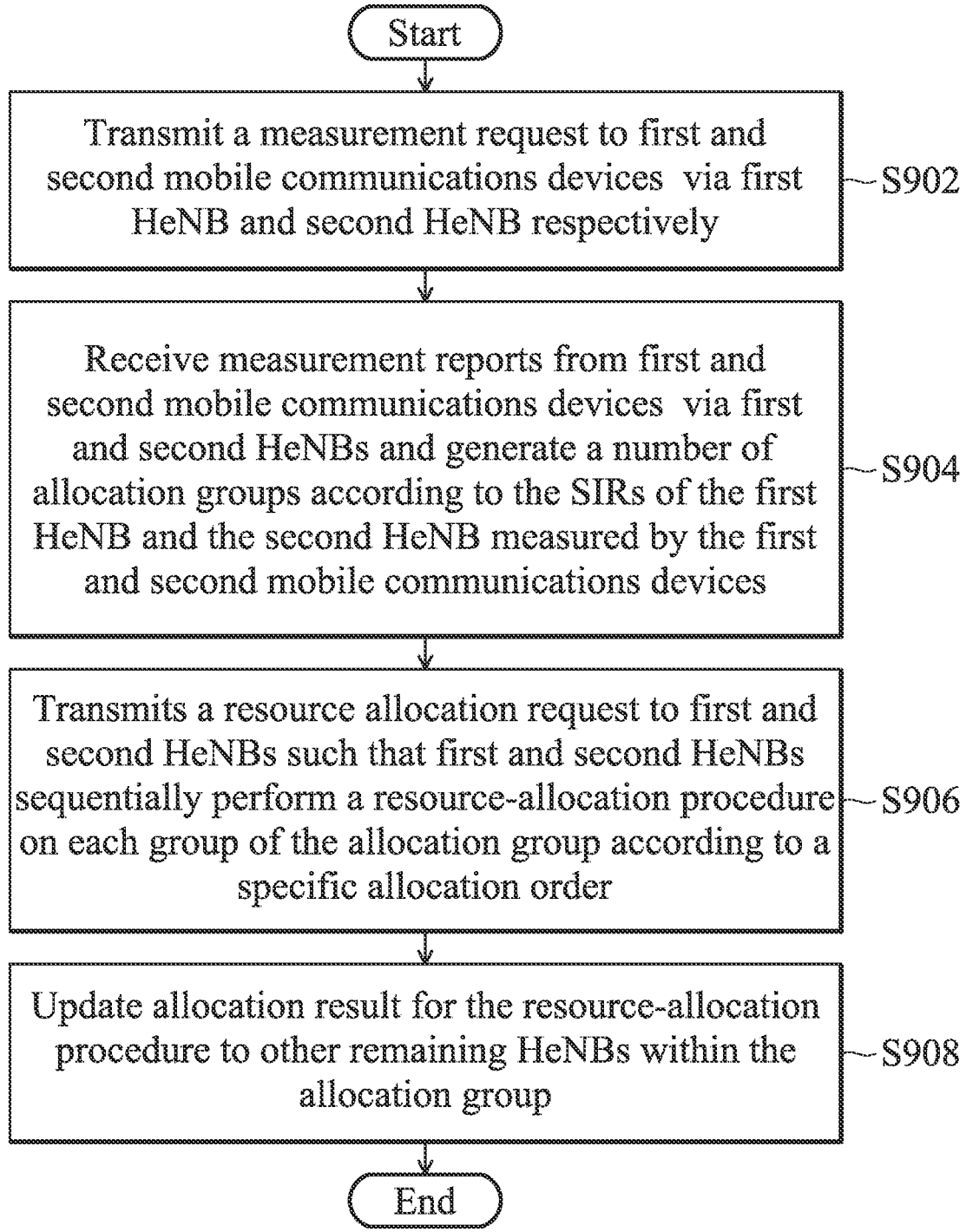
FIG. 9 is a flow chart illustrating a method for performing resource allocation according to the network-assisted embodiment in FIG. 7.

FIG. 9 is a flow chart illustrating a method for performing resource allocation according to the network-assisted embodiment in FIG. 7. As mentioned-above in FIG. 7, the mobile communications devices 310 and 320 connect to the network 70 through the control node 700 for obtaining wireless access services and the network 70 may comprise multiple HeNBs 110 and 210. It is noted that the mobile communications devices 310 and 320 in the HeNBs 110 and 210 may receive inter-interference between the HeNBs 110 and 210. First, the control node 700 transmits a measurement request to the first and second mobile communications devices 310 and 320 via the first HeNB 110 and the second HeNB 210 respectively such that the first and second mobile communications devices 310 and 320 perform a signal measurement on the first HeNB 110 and the second HeNB 210 (step S902).

The mobile communications devices 310 and 320 detect the signal strengths of the HeNB 110 and the neighboring HeNB 210 respectively and obtain responsive SIRs of the HeNB 110 and the HeNB 210. Thereafter, Upon reception of the measurement report reported by the mobile communications devices 310 and 320 via the HeNB 110 and the HeNB 210, the control node 700 generates a number of allocation groups according to the SIR of the HeNB 110 and the HeNB 210 measured by the first and second mobile communications devices 310 and 320 (step S904). Note that when the measured SIR of the first and second HeNBs 110 and 210 is less than a threshold, the first mobile communications device in the HeNB 110 is included in the first group of the HeNB 110 and the second group of the HeNB 210 simultaneously and the first and second groups form an allocation group. Then, the control node 700 transmits a resource allocation request to the HeNB 110 and the HeNB 210 respectively such that the HeNB 110 and the HeNB 210 sequentially perform a resource-allocation procedure on each group of the allocation group according to a specific allocation order (step S906). It is noted that the step of sequentially performing the resource-allocation procedure on each group of the allocation group according to the specific allocation order may further comprise the steps of determining the specific allocation order according to a member quantity of each group of the allocation group, wherein the resource-allocation procedure is first performed with the group that has a local maximum number of members among the allocation group. The first group comprises the first mobile communications device 310 and the second mobile communications device 320, each of the first and second mobile communications devices have a minimum resource requirement separately, and the resource allocation method may further comprise the steps of sequentially performing the resource-allocation procedure on the first mobile communications device 310 and the second mobile communications device 320 in the first group according to the minimum resource requirements corresponding thereto. In addition, when the second mobile communications device 320 of the first group does not meet the minimum resource requirement thereof, the resource-allocation procedure is first performed with the second mobile communications device 320. In some embodiments, the first HeNB 110 may further comprise a primary resource and a secondary resource and the second femtocell further comprises the secondary resource that is resources allocated by the HeNB 210 and the resource allocation method may further comprise the steps of allocating the primary resource to the second mobile communications device 320 according to the minimum resource requirement required by the second mobile communications device 320 and when the quantity of available resources remaining in the HeNB 110 does not meet the minimum resource requirement required by the second mobile communications device 320, allowing it to allocate the secondary resource to the second mobile communications device 320 and requesting that the second mobile communications device 320 discard using the secondary resource. After the resource-allocation procedure has been completed, the control node 700 updates an allocation result for the resource-allocation procedure to other remaining HeNBs within the allocation group (step S908). Upon reception of the updated allocation result for the resource-allocation procedure from the HeNB 110, the HeNB 210 performs subsequent resource-allocation procedure based on the updated allocation result and the allocation rules. It is noted that the control node 700 may also comprise a wireless module (not shown) for performing wireless transmission and reception and a controller module (not shown) for performing the above described method for resource allocation in this embodiment.

The method of the measurement reporting may be implemented in program code stored in a machine-readable storage medium, such as a magnetic tape, semiperformor, magnetic disk, optical disc (e.g., CD-ROM, DVD-ROM, etc.), or others, and when loaded and executed by a processing unit, a micro-control unit (MCU), or the controller module 314 in FIG. 1, the program code may perform the method of the measurement reporting. In addition, the method may be applied in mobile communications devices and service networks utilizing other radio access technologies (RATs), such as the UMTS Terrestrial Radio Access Network (UTRAN) of the UMTS, the Evolved Universal Terrestrial Radio Access Network (EUTRAN), the Worldwide Interoperability for Microwave Access (WiMAX) network, and others.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for resource allocation for use in a wireless communication system, wherein the wireless communication system comprises at least one first femtocell and one neighboring second femtocell and at least one first mobile communications device camped on the first femtocell, the method comprising:
   determining a first group corresponding to the first femtocell and a second group corresponding to the second femtocell according to at least one signal-to-interference ratio (SIR) of the first and second femtocells measured by the first mobile communications device and a threshold, wherein the first group includes the first mobile communications device and when the measured SIR of the first and second femtocells is less than the threshold, the first mobile communications device is included in the first group and the second group simultaneously and the first and second groups form an allocation group; and
   sequentially performing a resource-allocation procedure on each group of the allocation group according to a specific allocation order,
   wherein at least one second mobile communications device camps on the second femtocell and the first group comprises the first mobile communications device and the second mobile communications device, each of which having a minimum resource requirement separately, and the method further comprises:
   sequentially performing the resource-allocation procedure on the first mobile communications device and the second mobile communications device in the first group according the minimum resource requirements corresponding thereto; and
   when the second mobile communications device of the first group does not meet the minimum resource requirement thereof, the resource-allocation procedure is first performed with the second mobile communications device.

2. The method of claim 1, wherein the resource-allocation procedure is performed by the first femtocell or the second femtocell.

3. The method of claim 1, wherein the step of sequentially performing the resource-allocation procedure on each group of the allocation group according to the specific allocation order further comprises:
   determining the specific allocation order according to a member quantity of each group of the allocation group;
   wherein the resource-allocation procedure is first performed with the group that has a local maximum number of members among the allocation group.

4. The method of claim 1, wherein the first femtocell further comprises a primary resource and a secondary resource and the second femtocell further comprises the secondary resource, and the method further comprises:
   allocating the primary resource to the second mobile communications device according to the minimum resource requirement required by the second mobile communications device; and
   when the quantity of available resources remaining in the first femtocell does not meet the minimum resource requirement required by the second mobile communications device, allowing it to allocate the secondary resource to the second mobile communications device and requesting the second mobile communications device to discard using the secondary resource.

5. The method of claim 1, further comprising:
   after the resource-allocation procedure of the first femtocell has been completed, updating an allocation result for the resource-allocation procedure to the second femtocell; and
   the second femtocell performing the resource-allocation procedure based on the updated allocation result upon reception of the updated allocation result from the first femtocell.

6. The method of claim 1, wherein the wireless communication system further comprises a control node and the resource-allocation procedure is performed by the control node, at least one second mobile communications device camps on the second femtocell, and the method further comprises:
   the control node transmitting a measurement request to the first and second mobile communications devices via the first and second femtocells respectively such that the first and second mobile communications devices perform a signal measurement on the first and second femtocells to obtain the SIR of the first and second femtocells; and
   the control node receiving the SIR of the first and second femtocells measured by the first and second mobile communications devices generate the allocation group to perform the resource-allocation procedure based on the generated allocation group.

7. A wireless communication system, comprising:
   at least one first femtocell and one neighboring second femtocell;
   at least one first mobile communications device, camped on the first femtocell;
   at least one second mobile communications device camped on the second femtocell;
   a control node coupled on the first and second femtocells, performing data transmission and reception between the first and second femtocells;
   wherein the first femtocell or the control node determines a first group corresponding to the first femtocell and a second group corresponding to the second femtocell according to at least one SIR of the first and second femtocells measured by the first mobile communications device and a threshold, and sequentially performs a resource-allocation procedure on each group of an allocation group according to a specific allocation order;
wherein the first group includes the first mobile communications device and when the measured SIR of the first and second femtocells which is measured by the first mobile communications device is less than the threshold, the first mobile communications device is included in the first group and the second group simultaneously and the first and second groups form the allocation group,
wherein the first group comprises the first mobile communications device and the second mobile communications device, each of which having a minimum resource requirement separately, and the first femtocell further performs the resource-allocation procedure on the first mobile communications device and the second mobile communications device in the first group sequentially according the minimum resource requirements corresponding thereto; and
when the second mobile communications device of the first group does not meet the minimum resource requirement thereof, the resource-allocation procedure is first performed with the second mobile communications device.

8. The wireless communication system of claim 7, wherein the first femtocell further determines the specific allocation order according to a member quantity of each group of the allocation group, wherein the resource-allocation procedure is first performed with the group that has a local maximum number of members among the allocation group.

9. The wireless communication system of claim 7, wherein when the second mobile communications device of the first group does not meet the minimum resource requirement thereof, the first femtocell first performs the resource-allocation procedure with the second mobile communications device.

10. The wireless communication system of claim 7, wherein the first femtocell further comprises a primary resource and a secondary resource and the second femtocell further comprises the secondary resource, and the first femtocell further allocates the primary resource to the second mobile communications device according to the minimum resource requirement required by the second mobile communications device, and the first femtocell is further allowed to allocate the secondary resource to the second mobile communications device and requests the second mobile communications device to discard using the secondary resource when the quantity of available resources remaining in the first femtocell does not meet the minimum resource requirement required by the second mobile communications device.

11. The wireless communication system of claim 7, wherein after the resource-allocation procedure of the first femtocell has been completed, the first femtocell further updates an allocation result for the resource-allocation procedure to the second femtocell and the second femtocell performs the resource-allocation procedure based on the updated allocation result upon reception of the updated allocation result from the first femtocell.

12. The wireless communication system of claim 7, wherein the wireless communication system further comprises the control node, and the resource-allocation procedure is performed by the control node, wherein the control node further transmits a measurement request to the first and second mobile communications devices via the first and second femtocells respectively such that the first and second mobile communications devices perform a signal measurement on the first and second femtocells to obtain the SIR of the first and second femtocells, receives the SIR of the first and second femtocells measured by the first and second mobile communications devices to generate the allocation group to perform the resource-allocation procedure based on the generated allocation group.

13. A method for resource allocation for use in a femtocell, comprising:
transmitting a measurement request to at least one first mobile communications device, wherein the measurement request indicates the first mobile communications device to measure at least one signal-to-interference ratio (SIR) of the femtocell and at least one other femtocell neighboring the femtocell;
receiving a measurement report corresponding to the measurement request from the first mobile communications device, wherein the measurement report includes the SIR of the femtocell and the neighboring femtocell measured by the first mobile communications device;
determining a first group corresponding to the femtocell and a second group corresponding to the neighboring femtocell according to the SIR of the femtocell and the neighboring femtocell and a threshold, wherein the first group includes the first mobile communications device and when the measured SIR of the first and second femtocells that is measured by the first mobile communications device is less than the threshold, the first mobile communications device is included in the first group and the second group simultaneously, and the first and second groups form an allocation group; and
sequentially performing a resource-allocation procedure on each group of the allocation group according to a specific allocation order,
wherein the step of sequentially performing the resource-allocation procedure on each group of the allocation group according to the specific allocation order further comprises:
determining the specific allocation order according to a member quantity of each group of the allocation group;
wherein the resource-allocation procedure is first performed with the group that has a local maximum number of members among the allocation group; and
wherein at least one second mobile communications device camps on the neighboring femtocell and the first group comprises the first mobile communications device and the second mobile communications device, each of the first and second mobile communications devices have a minimum resource requirement separately, and the method further comprises:
sequentially performing the resource-allocation procedure on the first mobile communications device and the second mobile communications device in the first group according to the minimum resource requirements corresponding thereto; and
when the second mobile communications device of the first group does not meet the minimum resource requirement thereof, the resource-allocation procedure is first performed with the second mobile communications device.

14. The method of claim 13, wherein the first femtocell further comprises a primary resource and a secondary resource and the second femtocell further comprises the secondary resource and the method further comprises:
allocating the primary resource to the second mobile communications device according to the minimum resource requirement required by the second mobile communications device; and
when the quantity of available resources remaining in the first femtocell does not meet the minimum resource requirement required by the second mobile communications device, allowing it to allocate the secondary resource to the second mobile communications device and requesting that the second mobile communications device discard using the secondary resource.

15. A femtocell for performing resource allocation, comprising:

a wireless module, transmitting a measurement request to at least one first mobile communications device, wherein the measurement request indicates the first mobile communications device to measure at least one signal-to-interference ratio (SIR) of the femtocell and at least one other femtocell neighboring the femtocell; and a controller module, receiving a measurement report corresponding to the measurement request from the first mobile communications device via the wireless module, wherein the measurement report includes the SIR of the femtocell and the neighboring femtocell measured by the first mobile communications device, determining a first group corresponding to the femtocell and a second group corresponding to the neighboring femtocell according to the SIR of the femtocell and the neighboring femtocell and a threshold, and sequentially performing a resource-allocation procedure on each group of the allocation group according to a specific allocation order;

wherein the first group includes the first mobile communications device, and when the measured SIR of the first and second femtocells that is measured by the first mobile communications device is less than the threshold, the first mobile communications device is included in the first group and the second group simultaneously and the first and second groups form an allocation group, wherein at least one second mobile communications device camps on the neighboring femtocell and the first group comprises the first mobile communications device and the second mobile communications device, each of the first and second mobile communications devices have a minimum resource requirement separately, and the controller module further sequentially performs the resource-allocation procedure on the first mobile communications device and the second mobile communications device in the first group according to the minimum resource requirements corresponding thereto, and when the second mobile communications device of the first group does not meet the minimum resource requirement thereof, the controller module performs the resource-allocation procedure with the second mobile communications device.

\* \* \* \* \*